Patented Sept. 11, 1951

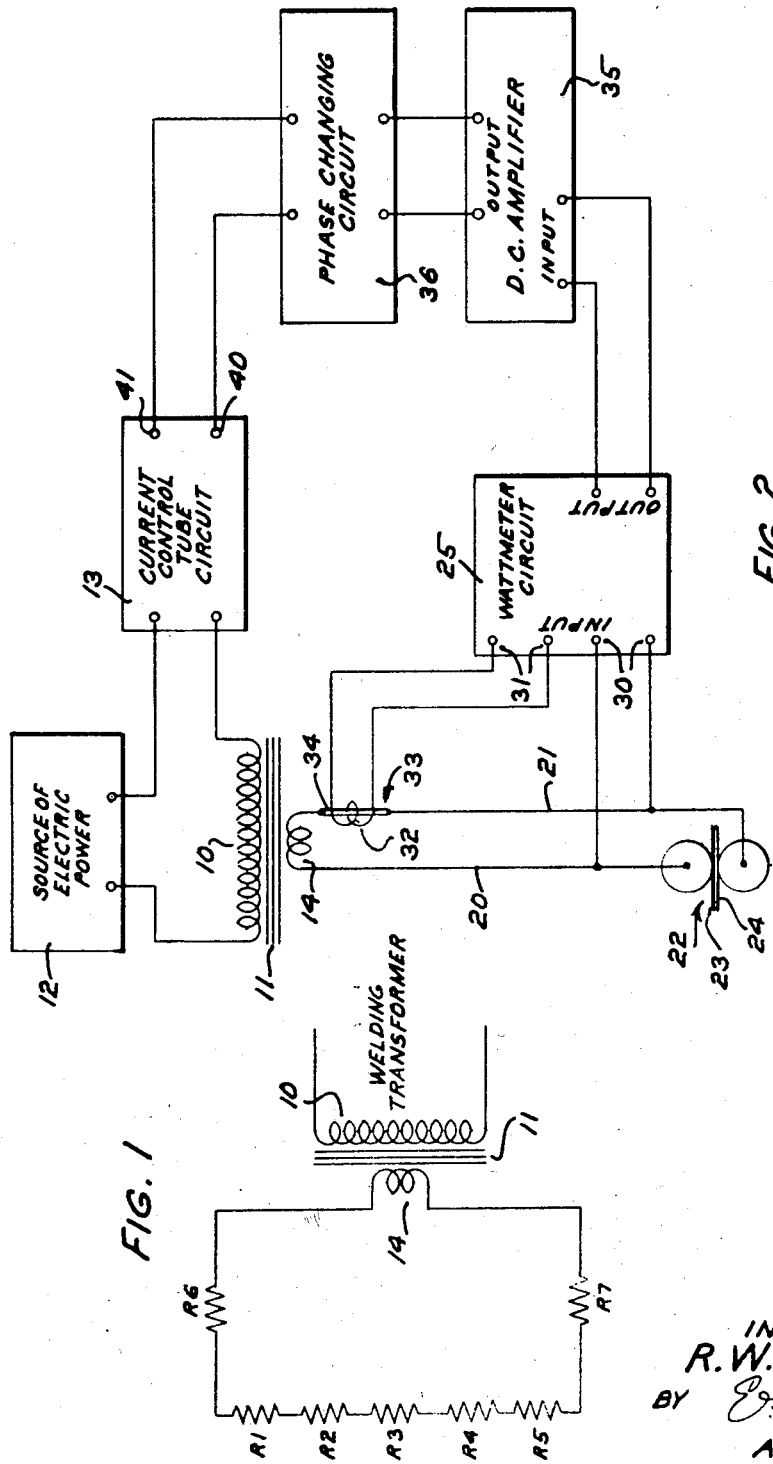

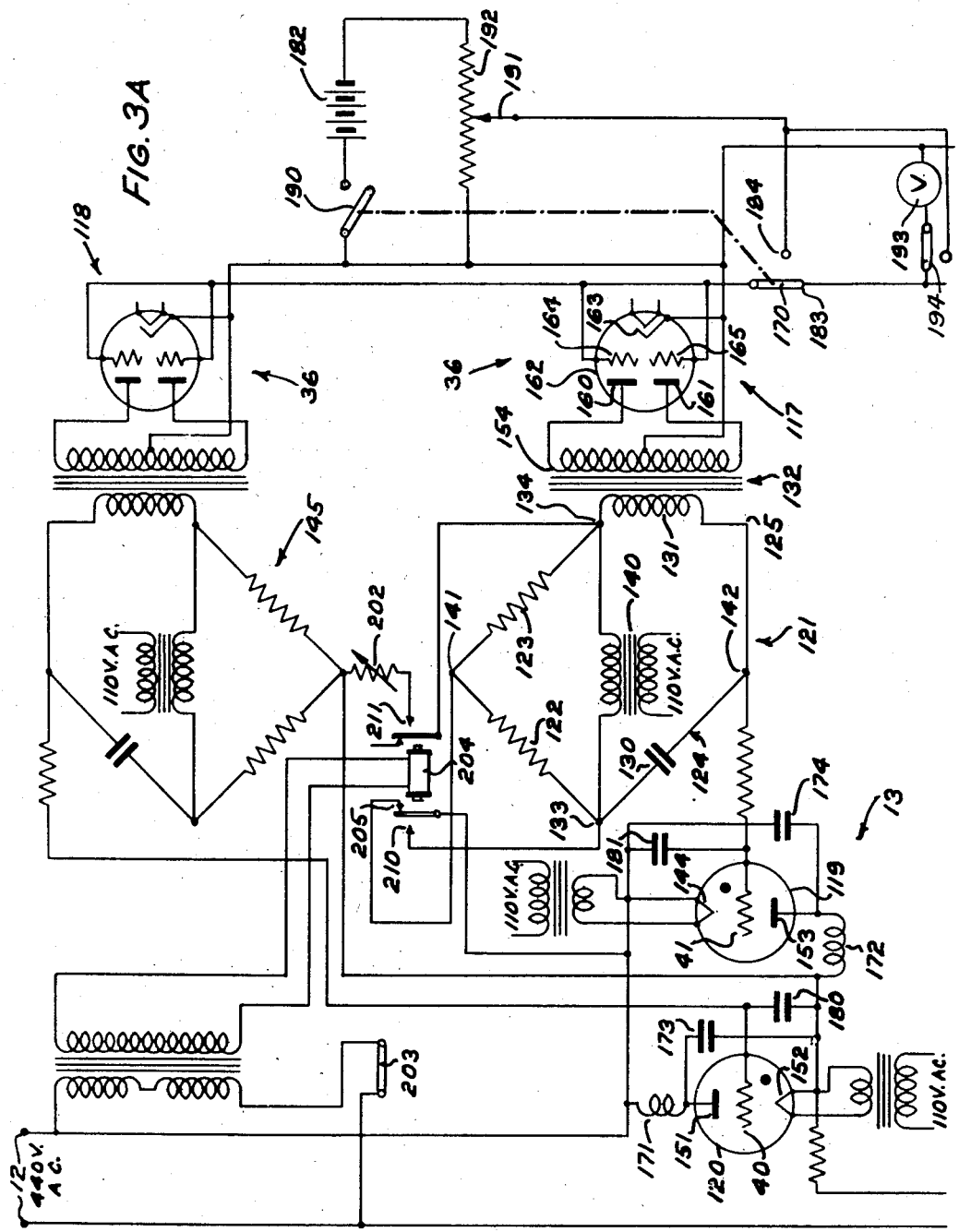

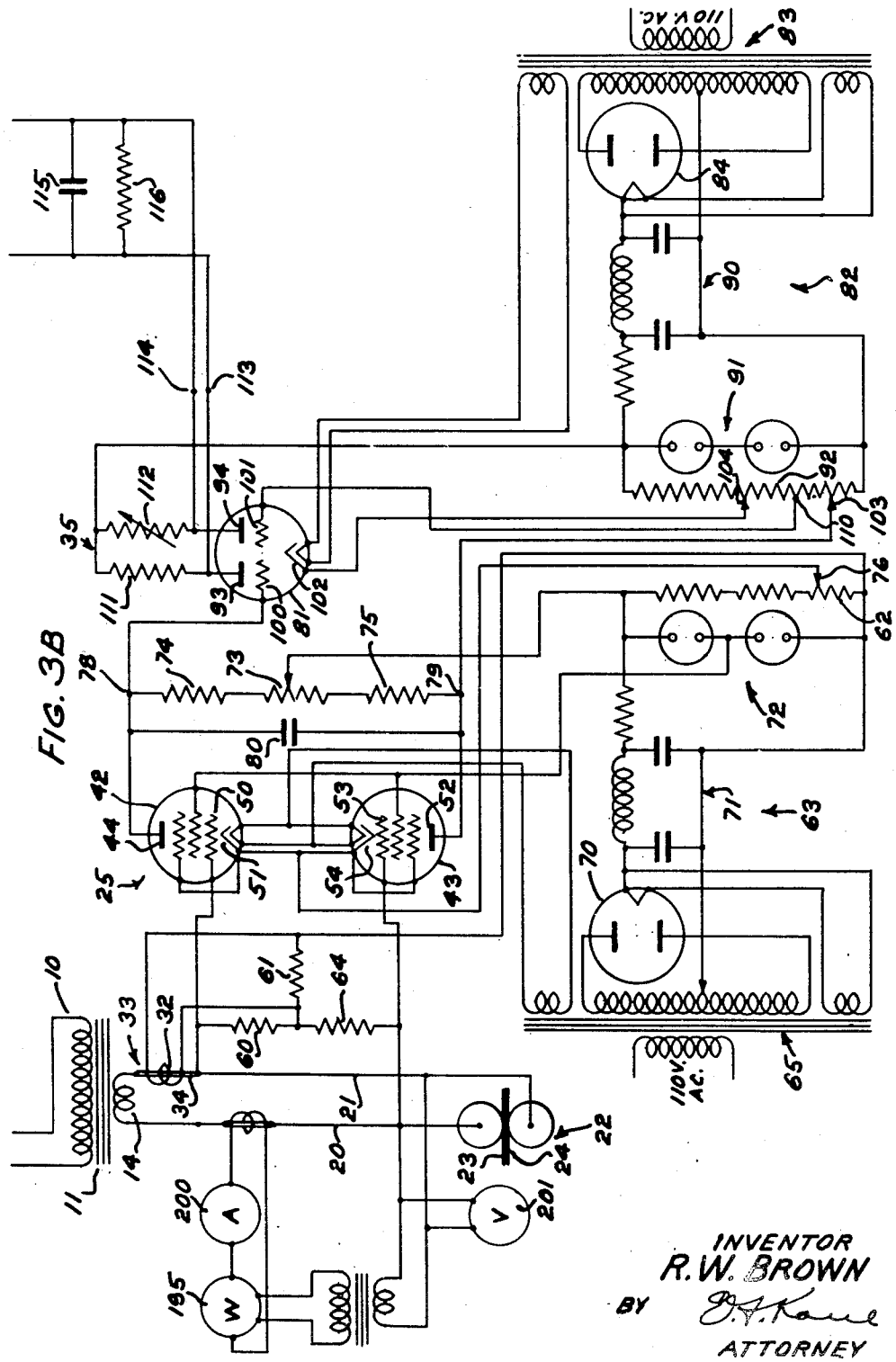

2,567,692

UNITED STATES PATENT OFFICE 2,567,692

APPARATUS FOR CONTROLLING ELECTRICAL POWER

Raymond W. Brown, Oak Forest, Ill., assignor to Western Electric Company, Incorporated, New York, N. Y., a corporation of New York Application May 10, 1948, Serial No. 26,018

3 Claims. (Cl. 323—102)

This invention relates to control apparatus for electrical power and more particularly to an apparatus for regulating welding power.

In the continuous electrical roll welding of a metal strip to a metal base, it is necessary that the weld quality be closely controlled in order to prevent the manufacture of large amounts of poorly welded material. Since it has been found that the power dissipated at the weld is a measure of the strength of the weld, it is desirable to maintain the weld power constant in order to insure uniformity of weld strength in welding a metal strip to a metal tape.

An object of this invention is to provide a new and efficient automatic apparatus for controlling the electrical power in a welding apparatus.

In accordance with one embodiment of this invention, a welding apparatus is provided wherein the variations of the power in the welding circuit are used to regulate the welding current by means of an electronic wattmeter circuit having its input connected to a welding circuit and its D. C. output connected through a D. C. amplifier to a phase control circuit for shifting the phase of the grid voltage applied to a current regulating electronic tube connected to the welding circuit.

A complete understanding of the invention may be had by referring to the following detailed description, taken in conjunction with the drawings, in which Fig. 1 is a diagram of the equivalent circuit of a welding loop;

Fig. 2 is a block diagram illustrating one embodiment of the invention; and

Figs. 3A and 3B, which when considered together with Fig. 3A placed above Fig. 3B, comprise a circuit diagram illustrating one embodiment of the invention.

The various equivalent resistances in a welding circuit for welding metal tape to metal strip are diagrammatically illustrated in the equivalent circuit shown in Fig. 1. R—1 represents the resistance from the electrode to the tape; R—2 the resistance of the tape; R—3 the resistance between the tape and the strip; R—4 the resistance of the strip; R—5 the resistance between the strip and the other electrode; and R—6 and R—7 the resistances of the leads to the electrodes. Although actual welding takes place only at R—3, the power dissipated in R—1, R—2, R—4 and R—5 is a part of the total power expended in the welding loop and is therefore closely related to the quality of the weld. The weld power will tend to vary due to any nonuniformity in the tape or strip, corrosion or roughness at the surface of the electrodes, line voltage variation or heating up of the bus bar leads. These, and other factors, are compensated for with the present invention.

The operation of the power regulator may be readily understood by following the block diagram (Fig. 2) of the apparatus in which the primary 10 of a welding transformer 11 is connected to a source of electrical power 12 through a current controlling electronic tube circuit 13 having therein gas-filled tubes. The secondary 14 of the transformer 11 is connected, through leads 20 and 21, to a pair of electrodes 22 between which metal strip 23 and metal tape 24 are roll welded. A voltage proportional to the voltage across the electrodes 22 and a voltage proportional to the current in the weld circuit are fed to the input of an electronic wattmeter circuit 25 at 30 and 31, respectively. The voltage proportional to the current in the welding circuit is obtained from the secondary 32 of a current transformer 33 having a primary 34 connected in series with the welding circuit between the electrodes and the secondary of the welding transformer.

The electronic wattmeter circuit 25 has a direct current output responsive to and changeable in accordance with changes in power in the welding circuit. The changes in the output of the wattmeter circuit 25 are amplified by a balanced direct current amplifier 35 whose output is connected to a phase-changing circuit 36 which regulates the phase of the voltage applied to the grids 41 and 40 of the electronic tubes in the tube circuit 13. If changes in the welding circuit cause the power at the weld to increase above a predetermined level, the D. C. output voltage of the wattmeter circuit 25 increases. This change is amplified by the D. C. amplifier 35 and is then fed into the phase-changing circuit 36 and a phase change proportional to the change in power is then applied to the grid voltages of the tubes in the tube circuit 13. This phase change is in such a direction as to cause these tubes to conduct for a lesser portion of the cycle, thereby reducing the power flow to the welding transformer 11. Thus, the power delivered to the weld is decreased to compensate for the increase detected by the wattmeter circuit 25. Conversely, when the power decreases at the weld below the predetermined level, the tube circuit 13 is caused to conduct for a greater portion of the cycle and the power at the weld is increased.

The first stage of the regulator is called a wattmeter circuit 25 herein because it is responsive to the power in the welding circuit and produces a D. C. output voltage proportional to the power in the welding circuit, which output is therefore a measure at all times of the power in the welding circuit. The wattmeter circuit 25 is provided with a pair of matched electronic vacuum tubes 42 and 43, the tube 42 having an anode 44, a control grid 50 and a cathode 51 and the tube 43 likewise being provided with an anode 52, a control grid 53 and a cathode 54. Both tubes 42 and 43 may be provided with suppressor and screen grids. The input circuit of tube 42 includes a resistor 60 connected to the input grid 50, and a resistor 61 connected to the resistor 60 and also to the cathode 51 through a bias voltage tap on a voltage divider 62 of a power supply 63. Similarly the input of the tube 43 includes a resistor 64 connected to the grid 53 and to the resistor 61 which is common to the inputs of both tubes.

The regulated power supply 63 provides anode, screen, bias and heater voltages for the tubes 42 and 43 and comprises a power transformer 65, a full-wave rectifier 70, a filter section 71, a voltage regulator section 72, and a voltage divider 62. The negative end of the voltage divider 62 is connected to the resistor 61 and the positive end is connected to the anodes 44 and 52 through a variable balancing resistor 73 and dropping resistors 74 and 75, respectively. A variable tap 76 near the negative end of the voltage divider 62 determines the grid bias on the tubes 42 and 43 which operate on the curved portion of their $e_g$—$I_p$ curves. Screen voltage for the tubes 42 and 43 is provided from a tap in the voltage regulator section 72 of the power supply.

The wattmeter circuit being a balanced arrangement, the resistors 60 and 64, preferably, have the same resistance and the resistors 74 and 75 should be matched. A condenser 80 connected between the anodes 44 and 52 provides smoothing action to the output of the wattmeter circuit, and its capacitance value is a controlling factor in the response time of the apparatus.

An input voltage proportional to the voltage in the welding circuit is furnished to the wattmeter circuit 25 by applying across resistors 60 and 64 the voltage between the welding leads 21 and 20, and a voltage proportional to the current in the welding circuit is fed into the wattmeter circuit by connecting the secondary 32 of the current transformer 33 across the resistor 61. It is apparent that one of the wattmeter tubes will always receive in its input grid the sum of the input voltages across the resistors in its input, and the input grid of the other tube will receive the difference of the input voltages across the resistors in its input circuit. Differential anode currents through the resistors 74, 73 and 75 set up a D. C. potential difference between circuit points 78 and 79, which potential difference at any given time is a measure of power in the weld circuit. The bias voltage for the grids 50 and 53 is adjusted at the voltage divider 62 so that when the power in the weld is at a predetermined desired level the D. C. output voltage at circuit points 78 and 79 will have a predetermined reference value, with the circuit point 78 being of positive polarity. If the polarity is reversed, the desired polarity may be obtained by reversing either the input leads across the resistor 61 or the input leads across the resistors 60 and 64.

The D. C. output of the wattmeter circuit 25 is fed into the input of the balanced D. C. amplifier 35 which comprises a double triode electronic vacuum tube 81 and an associated regulated power supply 82 having a power transformer 83, a full-wave rectifier 84, a filter section 90, a regulator section 91, and a voltage divider 92. The tube 81 includes a pair of anodes 93 and 94, a pair of grids 100 and 101, and a common cathode 102. One side 78 of the wattmeter circuit output is connected to the grid 100 of the tube 81, and the other side 79 is connected to the cathode 102 through a portion of the voltage divider 92 between variable taps 103 and 104, which portion of the voltage divider furnishes the bias voltage for the grid 100. A predetermined bias voltage is furnished to the grid 101 from a tap 110 on the voltage divider 92. Voltages for the anodes 93 and 94 are obtained from the positive end of the voltage divider 92 which is connected to the anodes 93 and 94 through resistors 111 and 112, respectively, the resistor 112 preferably being variable.

The output of the amplifier 35 at circuit points 113 and 114 is the voltage drop across the resistors 111 and 112 due to differential anode currents of the two triode sections in the tube 81. A condenser 115 is connected across the amplifier output to provide filtering action, and a resistor 116 across the output provides a stabilizing load. The bias voltages on the grids 100 and 101 are adjusted at the voltage divider 92 to so relate them that the bias voltage on the grid 101 will be nearly equal to the difference between the bias voltage on the grid 100 and the signal voltage on the grid 100 when the power at the weld is at the desired level.

As pointed out before, the object of the amplifier is to amplify the changes in the D. C. output of the wattmeter circuit at circuit points 78 and 79 in order to utilize these changes to control the phase of the voltages applied on the grids 40 and 41. The output of the amplifier 35 is connected to two parallel phase-changing circuits 117 and 118, one (117) for controlling the phase of the grid voltage in a gas-filled electronic tube 119, and the other (118) for controlling the phase of the voltage on the grid in a second gas-filled tube 120. Both of the phase-changing circuits being similar, only the one designated as 117 will be described.

The phase-changing circuit 117 regulates the phase of the output of a bridge 121 having a pair of equal ratio resistance arms 122 and 123 and two adjacent reactive arms 124 and 125. Reactive arm 124 consists of a condenser 130, whereas the arm 125 is inductive and includes one of the windings 131 on an impedance transformer 132. An alternating current is supplied to the input of the bridge 121 at 133 and 134 from the secondary of a transformer 140 whose primary is connected to a source of alternating current. The output of the bridge at 141 and 142 supplies the grid voltage to the gas-filled electronic tube 119, the point 142 of the bridge being connected to the grid 41 and the point 141 being connected to the cathode 144 of the tube 119. In the same manner a bridge 145 controlled by the phase-changing circuit 118 supplies the grid voltage on the grid 40 of the second gas-filled electronic tube 120, the two gas tubes being connected back-to-back in series with the primary 10 of the welding transformer 11. By back-to-back relation, it is meant that the plate of one tube and the cathode of the other tube are tied together and vice-versa. As shown in the drawing, the cathode 144 is tied to the anode 151 and the cathode 152 is tied to the anode 153. The back-to-back relation of the tubes permits current flow through the primary 10 of the welding transformer 11 during both alternations of each cycle.

A center-tapped winding 154 on the impedance transformer 132 has its outer ends connected to the separate anodes 160 and 1161 of a double-triode electronic vacuum tube 162 having a common cathode 163 connected to the center tap of the winding 154 and also having a pair of control grids 164 and 165 normally connected through a switch 170 to one side 113 of the output of the amplifier 35, the other side 114 of the amplifier output being connected to the cathode 163 of the tube 162.

It will be seen that the winding 154 and the tube 162 form a closed full-wave rectifier circuit receiving its anode voltage inductively from the winding 131 which may be likened to the primary of a power transformer in a conventional rectifier circuit. The anode currents of the two triode sections of the tube 162 which flow as direct currents through the winding 154 are regulated by and are dependent upon the potential on the grids 164 and 165 which in turn depends on the output of the amplifier 35. An amplitude change of the direct current in the winding 154 will, on the principle of the saturable reactor, change the inductive reactance of the winding 131, thereby shifting the phase of the output voltage of the bridge 121. As indicated before, a phase shift in this voltage changes the amount of average current conducted by the gas tube 119. The constants of the circuit elements should be selected and adjusted so that when the power at the weld is at the desired level the output of the amplifier 35 will furnish an equilibrium voltage on the grids 164 and 165 that will permit the right amount of anode current to flow through the winding 154 in order to effect the phase displacement of the voltage on the grid 41 that will permit the tube 119 to conduct the desired amount of current to the welding transformer 11.

In order to stabilize the gas tubes 119 and 120 and to protect them from undesirable transient currents, choke coils 171 and 172 are inserted in series with the anodes 151 and 153 and the tubes are shunted by condensers 173 and 174. Condensers 180 and 181 are connected between the grids and the cathodes of the tubes 120 and 119, respectively, to stabilize operation.

A convenient method for initially setting the regulating apparatus for a particular desired weld power is to determine the necessary grid voltage on the grids of the double triodes in the phase-changing circuits that will cause the tubes 119 and 120 to conduct the required amount of current to deliver the desired weld power. This may be accomplished by feeding the grids of the double triodes in the phase-changing circuits with an independent variable voltage from a battery 182 instead of the output voltage from the amplifier 35. Voltage from the battery 182 may be substituted for the output of the amplifier 35 by opening the circuit at 183 and closing the circuit at 184 with the switch 170 and, at the same time, closing a switch 190. This operation connects the positive side of the battery 182 to the cathodes of the double triodes in the phase-changing circuit and connects the grids of those tubes to the variable arm 191 of a potentiometer 192 connected across the battery 182. To provide an indication of the grid voltages on the grids of the double triodes in the phase-changing circuits a voltmeter 193 may be connected between the grids and the cathodes of the tubes by means of a switch 194. The grid voltage is then varied by moving the potentiometer arm 191 until the desired weld power is being delivered in the welding circuit. When the required grid voltage is ascertained, the voltmeter 193 is connected across the output of the amplifier 35 by means of the switch 194 and the amplifier output is then adjusted by moving the tap 103 on the voltage divider 92 until the voltmeter 193 registers the required reference voltage ascertained by means of the substituted battery circuit, after which the output of the amplifier 35 is substituted for the battery 182 by opening the switch 190 and operating the switch 170 to open the circuit at 184 and close the circuit at 183. These adjustments should be made when the desired weld power is being delivered, which power and its current and voltage components may be checked by a wattmeter 195, an ammeter 200 and a voltmeter 201 properly connected to the welding circuit.

To insure stability, it is desirable that the tubes 119 and 120 conduct current during standby time when the welder is not in actual operation. For this purpose a certain amount of anode voltage is applied to the tubes 119 and 120 by connecting the input bridge points 133 and 134 of the bridge 121 across the tubes 119 and 120 through a power dissipating resistor 202 during the standby time. This is done by opening a relay operating circuit at a switch 203 during the standby time to deenergize and release a relay 204, thereby opening the circuit at 205 and closing the circuits at 210 and 211. Obviously, the relay 204 must be energized and operated while the welding apparatus is in operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for regulating the electrical power delivered to a load comprising a pair of series connected resistors shunting said load, a current transformer having its primary winding in the load circuit, a third resistance element connected across the secondary of said current transformer, said third resistance element having one of its ends connected to the junction of said pair of resistors, a pair of electronic tubes each having an anode, a cathode, and a control grid, a source of balanced D. C. plate potential for said tubes, connectors connecting the control grids of said tubes across said series connected resistors and the cathodes of said tubes to the other end of said third resistance, to thereby render said tubes conductive in response to power changes in the load circuit, an output circuit for said tubes including a load resistance connected across the plates of said tubes, a D. C. amplifier comprising a first and a second tube section each having an anode, a cathode and a control grid, a source of balanced D. C. plate potential for said tube sections, a multi-tapped resistance connected across said last named source, means connecting the contol grid of the first of said tube sections to one side of said load resistance, means connecting the other side of said load resistance to the cathodes of said tube sections through a first tapped portion of said multi-tapped resistance, means connecting said other side of said load resistance to the control grid of said second tube section through a second tapped portion of said multi-tapped resistance, a plate resistance connected to each plate of said tube sections, a phase sensitive electronic device connected in series with said load to control the current thereto, said electronic device having an anode, a cathode and a control grid, means for applying a phase shiftable alternating current to said last named grid for controlling said electronic device, the last said means including a network having an inductive branch, means for shifting the phase of said alternating current to said last named grid comprising a center tapped coil inductively coupled to said inductive branch, a third electronic tube section having an anode, a cathode and a grid, a fourth electronic tube section having an anode, a cathode and a grid, the anode of said third tube section being connected to one end of said center tapped coil, the anode of said fourth tube section being connected to the other end of said center tapped coils, the center tap of said coil being connected to the cathodes of said third and fourth tube sections, and the grids of said third and fourth tube sections being coupled to the respective plates of said first and second tube sections whereby said third and fourth tube sections are rendered conductive in response to differential plate currents flowing in said first and second tube section.

2. Apparatus for regulating the electrical power delivered to a load comprising a pair of series connected resistors shunting said load, a current transformer having its primary winding in the load circuit, a third resistance element connected across the secondary of said current transformer, said third resistance element having one of its ends connected to the junction of said pair of resistors, a pair of electronic tubes each having an anode, a cathode and a control grid, a source of balanced D. C. plate potentials for said tubes, connectors connecting the control grids of said tubes across said series connected resistors and the cathodes of said tubes to the other end of said third resistance, to thereby render said tubes conductive in response to power changes in the load circuit, an output circuit for said tubes including a load resistance connected across the plates of said tubes, an amplifier for amplifying the direct current output of said tubes appearing across said load resistance, a phase sensitive electronic device for controlling the current to said load, said electronic device having an anode, a cathode and a grid, means for applying alternating current to said grid comprising an impedance bridge having an alternating current input and an alternating current output connected to said grid, said bridge also having in one arm an inductance coil and means responsive to the amplified direct current output of said amplifier for changing said inductance thereby to shift the phase of said bridge output in accordance with changes in said direct current output.

3. Apparatus for regulating the electrical power delivered to a load comprising a pair of series connected resistors shunting said load, a current transformer having its primary winding in the load circuit, a third resistance element connected across the secondary of said current transformer, said third resistance element having one of its ends connected to the junction of said pair of resistors, a pair of electronic tubes each having an anode, a cathode and a control grid, a source of balanced D. C. plate potential for said tubes, connectors connecting the control grids of said tubes across said series connected resistors and the cathodes of said tubes to the other end of said third resistance, to thereby render said tubes conductive in response to power changes in the load circuit, an output circuit for said tubes including a load resistance connected across the plates of said tubes, a D. C. amplifier comprising a first and a second tube section each having an anode, a cathode and a control grid, a source of balanced D. C. plate potential for said tube sections, means connecting the control grid of the first of said tube sections to one side of said load resistance, means including a first biasing resistance connecting the other side of said load resistance to the cathodes of said tube sections, means including a second biasing resistance connecting said other side of said load resistance to the control grid of said second tube section, a plate resistance connected to each plate of said tube sections, a phase sensitive electronic device connected in series with said load to control the current thereto, said electronic device having an anode, a cathode and a control grid, means for applying a phase shiftable alternating current to said grid for controlling said electronic device, the last said means including a network having an inductive branch, means for shifting the phase of said alternating current to said grid comprising a center tapped coil inductively coupled to said inductive branch, a third electronic tube section having an anode, a cathode and a grid, a fourth electronic tube section having an anode, a cathode and a grid, the anode of said third grid section being connected to one end of said center tapped coil, the anode of said fourth tube section being connected to the other end of said center tapped coil, the center tap of said coil being connected to the cathode of said third and fourth tube sections and the grids of said third and fourth tube sections being coupled to the respective plates of said first and second tube sections whereby said third and fourth tube sections are rendered conductive in response to differential plate currents flowing in said first and second tube sections.

RAYMOND W. BROWN.

REFERENCES CITED

The following references are of record in the file of this patent:

UNITED STATES PATENTS

| Number | Name | Date |
| --- | --- | --- |
| 1,586,533 | Peterson | June 1, 1926 |
| 2,181,321 | Friedlander | Nov. 28, 1939 |
| 2,197,934 | Koch | Apr. 23, 1940 |
| 2,373,543 | Cooper | Apr. 10, 1945 |
| 2,393,884 | Callender | Jan. 29, 1946 |
| 2,435,572 | Bixby | Feb. 10, 1948 |
| 2,435,573 | Bixby | Feb. 10, 1948 |